US008874433B2

(12) United States Patent
Chalabi et al.

(10) Patent No.: US 8,874,433 B2
(45) Date of Patent: Oct. 28, 2014

(54) SYNTAX-BASED AUGMENTATION OF STATISTICAL MACHINE TRANSLATION PHRASE TABLES

(75) Inventors: Achraf Chalabi, Cairo (EG); Waleed Ammar, Redmond, WA (US); Mostafa Ashour, Cairo (EG)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 13/112,266

(22) Filed: May 20, 2011

(65) Prior Publication Data
US 2012/0296633 A1 Nov. 22, 2012

(51) Int. Cl.
*G06F 17/27* (2006.01)
*G06F 17/28* (2006.01)

(52) U.S. Cl.
CPC ........ *G06F 17/2818* (2013.01); *G06F 17/2827* (2013.01)
USPC .......................................................... 704/9

(58) Field of Classification Search
CPC ....... G06F 17/21; G06F 17/28; G06F 17/277; G06F 17/2775; G06F 17/2785; G06F 17/30684
USPC .................................. 704/4, 9, 10
See application file for complete search history.

(56) References Cited

U.S. PATENT DOCUMENTS

| | | | |
|---|---|---|---|
| 5,768,603 A * | 6/1998 | Brown et al. ...................... 704/9 |
| 5,805,832 A * | 9/1998 | Brown et al. ...................... 711/1 |
| 6,223,150 B1 * | 4/2001 | Duan et al. ........................ 704/9 |
| 6,243,669 B1 * | 6/2001 | Horiguchi et al. ................ 704/9 |
| 6,282,507 B1 * | 8/2001 | Horiguchi et al. ................ 704/3 |
| 6,356,865 B1 * | 3/2002 | Franz et al. ....................... 704/2 |
| 6,374,224 B1 * | 4/2002 | Horiguchi et al. ............ 704/266 |
| 6,393,389 B1 * | 5/2002 | Chanod et al. .................... 704/7 |
| 6,463,404 B1 * | 10/2002 | Appleby ............................ 704/9 |
| 6,782,384 B2 * | 8/2004 | Sloan et al. ......................... 1/1 |
| 2001/0029443 A1 * | 10/2001 | Miyahira .......................... 704/7 |
| 2005/0005266 A1 * | 1/2005 | Datig ............................ 717/136 |
| 2007/0083359 A1 | 4/2007 | Bender | |
| 2007/0219933 A1 * | 9/2007 | Datig ................................ 706/4 |

(Continued)

OTHER PUBLICATIONS

Shirko, et al., "Machine Translation of Noun Phrases from Arabic to English Using Transfer-Based Approach", Retrieved at <<http://www.scipub.org/fulltext/jcs/jcs63350-356.pdf>>, Journal of Computer Science, vol. 06, Issue 03, 2010, pp. 350-356.

(Continued)

*Primary Examiner* — Michael N Opsasnick
(74) *Attorney, Agent, or Firm* — Steve Wight; Judy Yee; Micky Minhas

(57) ABSTRACT

Machine translation phrase table augmentation embodiments are described that employ an automatic syntax-based scheme to produce additional phrase pairs and insert them into a phrase table. One general process implementing this augmentation involves inputting one or more syntactic transfer patterns, and for each pattern synthesizing phrases in a source language of the type associated with the pattern using a source language lexicon. Phrases, such as those not found in a monolingual corpus of the source language, are eliminated from the synthesized phrases. Each of the remaining synthesized phrases is then translated into the target language using the syntactic transfer pattern, a bilingual source-to-target language dictionary, and a morphological synthesizer. Those translated phrases not found in a monolingual corpus of the target language are then eliminated. Phrase pairs made up of a remaining translated phrase and its corresponding source language phrase are then added to the phrase table being augmented.

20 Claims, 5 Drawing Sheets

(56) References Cited

U.S. PATENT DOCUMENTS

| | | | |
|---|---|---|---|
| 2007/0282590 A1* | 12/2007 | Suzuki et al. | 704/2 |
| 2008/0086300 A1* | 4/2008 | Anismovich et al. | 704/9 |
| 2008/0126074 A1* | 5/2008 | Whitelock et al. | 704/2 |
| 2009/0043564 A1* | 2/2009 | Hwang et al. | 704/4 |
| 2009/0070099 A1* | 3/2009 | Anisimovich et al. | 704/5 |
| 2010/0332217 A1* | 12/2010 | Wintner et al. | 704/9 |
| 2011/0040552 A1* | 2/2011 | Van Guilder et al. | 704/4 |

OTHER PUBLICATIONS

Shaalan, et al., "Machine Translation of English Noun Phrases into Arabic", Retrieved at <<http://citeseerx.ist.psu.edu/viewdoc/download?doi=10.1.1.97.7586&rep=rep1&type=pdf>>, International Journal of Computer Processing of Languages (IJCPOL), vol. 17, Issue 02, 2004, pp. 121-134.

Shaalan, Khaled, "Machine Translation of Arabic Interrogative Sentence into English", Retrieved at <<http://citeseerx.ist.psu.edu/viewdoc/download?doi=10.1.1.113.2443&rep=rep1&type=pdf>>, In Proceedings of the 8th International Conference on Artificial Intelligence Applications, Egyptian Computer Society (EGS), 2000, pp. 473-483.

Elming, et al., "Syntactic Reordering for English-Arabic Phrase-Based Machine Translation", Retrieved at <<http://www.mt-archive.info/EACL-2009-Elming.pdf>>, Proceedings of the EACL 2009 Workshop on Computational Approaches to Semitic Languages, Mar. 31, 2009, pp. 69-77.

Aref, et al., "English to Arabic Machine Translation: A Critical Review and Suggestions for Development", Retrieved at <<http://www.ccse.kfupm.edu.sa/~husni/Research/MtReview.pdf>>, 1995, pp. 7.

"Partner EA800 English To and From Arabic Talking Electronic Dictionary and Audio PhraseBook", Retrieved at <<http://aramedia.com/talkdict2.htm>>, Retrieved at: Mar. 9, 2011, pp. 3.

* cited by examiner

SYNTAX-BASED AUGMENTATION OF STATISTICAL MACHINE TRANSLATION PHRASE TABLES

BACKGROUND

Machine translation refers to a computer-implemented translation of text from one language referred to as the source language to another language referred to as the target language. For example, machine translation can be employed to translate English language text into Arabic. There are several approaches to implement this machine translation, the most popular of which is Statistical Machine Translation (SMT). Typical SMT systems are driven by several models, the most important of which are the phrase table and the language model. The phrase table is a huge collection of aligned phrase pairs. Each phrase pair consisting of a source language phrase and the corresponding target language phrase, where a phrase can be made up of one or more tokens. Associated with each phrase pair are a set of probabilities.

During actual translation, the source language is segmented, based on segments found in the phrase table. Usually, more than one possible segmentation is generated. For each of the possible segmentation, each segment is translated into one or more translations provided by the phrase table. A reordering model is used to generate possible reordering alternatives of the target translations. A lattice of possible sentence translations is generated based on the different segmentations, phrase translations and reordering hypotheses, and presented to a decoder which, driven by a target language model, will identify the most likely paths, and hence generate a ranked list of possible translations.

Typically, phrase pairs are learned through automatic alignment of manually translated source language sentences. The translation accuracy is highly dependent on the coverage of the phrase table which in turn is dependent on the size of the training data consisting of the parallel sentences.

SUMMARY

Machine translation phrase table augmentation embodiments described herein generally employ an automatic syntax-based scheme to identify additional phrase pairs and insert them into the phrase table, so as to increase the accuracy of phrase-based machine translation. One general process implementing this augmentation involves inputting one or more syntactic transfer patterns, each of which defines the syntax of a translation to a target language of a different phrase structure in a source language. For each syntactic transfer pattern input, phrases in the source language of the type associated with the pattern under consideration are synthesized using a lexicon of the source language. Phrases that are not found in a monolingual corpus of the source language are then eliminated from the synthesized phrases. Each of the remaining synthesized phrases is then translated into the aforementioned target language using the selected syntactic transfer pattern, a bilingual source-to-target language dictionary, and an appropriate morphological synthesizer to properly inflect the words of the translated phrase. In one implementation, those translated phrases not found in a monolingual corpus of the target language are eliminated. Phrase pairs made up of a remaining translated phrase and its corresponding source language phrase are then identified. Identified phrase pairs that are already found in a current version of the machine translation phrase table being augmented are eliminated, and the remaining phrase pairs are added to the phrase table. In one implementation, a probability representing the likelihood that the source language phrase of the phrase pair actually translates to the target language phrase of the pair is computed for each of the identified phrase pairs, and then added along with its associated phrase pair to the phrase table.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of machine translation phrase table augmentation embodiments, reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Machine Translation Phrase Table Augmentation

Embodiments of the augmentation of a machine translation phrase table described herein generally employ an automatic syntax-based scheme to generate additional phrase pairs and insert them into the phrase table. Each of these additional phrase pairs associates a phrase in a source language of the phrase table, with a phrase in a target language of the table. Automatically populating a phrase table with additional source-target language phrase pairs has a significant advantage in that it increases the number of phrases in the source language text being translated that can be found in the phrase table. Thus the accuracy of the translation is increased.

Figure 1:
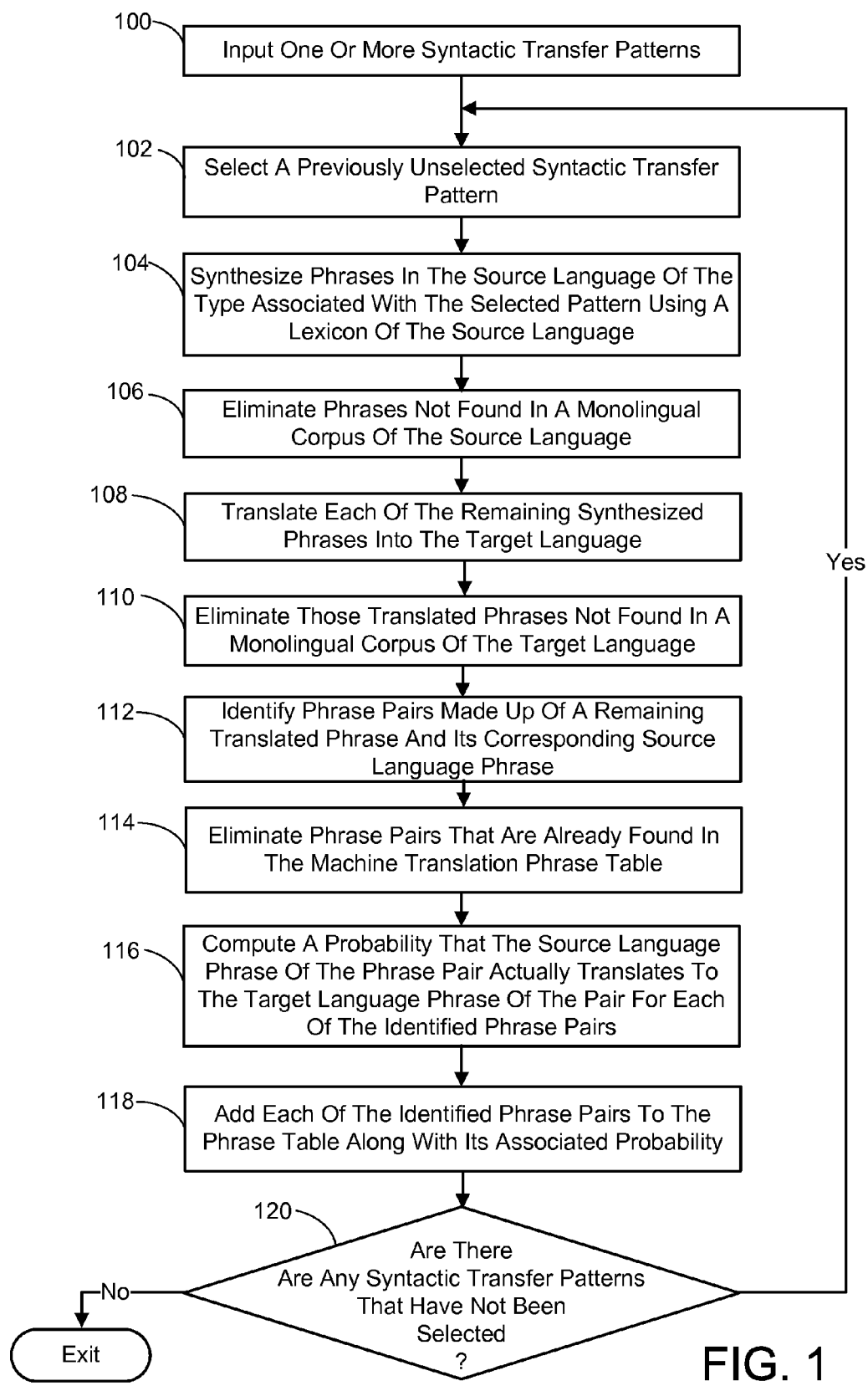
FIG. 1 is a flow diagram generally outlining one embodiment of a process for augmenting a machine translation phrase table.

One general process implementing the augmentation of a machine translation phrase table is illustrated in FIG. 1. This process involves using a computer (such as one of the computing devices described in the Exemplary Operating Environments section to follow) to, among other things, input one or more syntactic transfer patterns (process action 100). Each of the inputted patterns defines the syntax of a translation to the aforementioned target language of a different phrase structure in the aforementioned source language, where each source language phrase type represents a phrase having a particular syntactic structure that is different from the other source language phrase types. A previously unselected one of the inputted syntactic transfer patterns is selected next (process action 102), and phrases in the source language of the type associated with the selected pattern are synthesized using a lexicon of the source language (process action 104). In one implementation, synthesizing phrases in the source language involves synthesizing a phrase for every possible combination of words in the lexicon that correspond to syntactic constituents of the source language phrase type corresponding to the selected pattern. Phrases that are not found in a monolingual corpus of the source language are then eliminated from the synthesized phrases (process action 106). This action ensures that only linguistically-valid phrases of the selected type in the source language (and their translations) are eventually added as phrase pairs in the phrase table.

Each of the remaining synthesized phrases is then translated into the aforementioned target language (process action 108). As will be described in more detail later, in one implementation, this action is accomplished using the selected syntactic transfer pattern, a bilingual source-to-target language dictionary, and an appropriate morphological synthesizer to properly inflect the words of the translated phrase. Once the remaining synthesized phrases have been translated, in one implementation, those translated phrases not found in a monolingual corpus of the target language are eliminated (process action 110). This action ensures that only phrase pairs associate with linguistically valid phrases seen in the target language are added to the phrase table.

Phrase pairs are then identified (process action 112). Each of these identified phrase pairs is made up of a remaining translated phrase and its corresponding source language phrase. In one implementation, phrase pairs that are already found in a current version of the machine translation phrase table being augmented are eliminated (process action 114). This prevents inserting phrase pairs that have already been seen during training in the phrase table.

Additionally, in one implementation, a probability is computed for each of the remaining identified phrase pairs (process action 116). This probability represents the likelihood that the source language phrase of the phrase pair actually translates to the target language phrase of the pair. For example, in one implementation, the frequency that the target language phrase of a phrase pair appears in a monolingual corpus of the target language is a factor used for the probability computation. In another implementation, the frequency that the source language phrase appears in the monolingual corpus of the source language is a factor used for the probability computation. In another implementation, the frequency of target phrases already in the phrase table which correspond to the same source phrase in the added phrase pair is a factor used for the probability computation. And in yet another implementation, probabilities already established in the phrase table for the redundant phrase pairs eliminated in process action 114 are used as a factor for the probability computation. In addition, the probability computation can include using any combination of the foregoing factors, as well as other factors as desired.

Each of the remaining identified phrase pairs is then added to the current version of the phrase table, along with its associated probability if computed (process action 118). Next, it is determined if there are any inputted syntactic transfer patterns that have not yet been selected and processed (process action 120). If there are previously unselected patterns, then process actions 102 through 120 are repeated as appropriate until all the patterns have been considered.

It is noted that in the context of the foregoing description the term "lexicon" is defined broadly as the vocabulary of a language. Any digitized source of a language's vocabulary can be employed. A digital dictionary would be an example of such a source. The term "word" is also used broadly in that it can include numbers, symbols, and other marks. The term "monolingual corpus" used herein is defined as a large set of digitized text in a single language. Here again, any digitized source of a monolingual corpus can be employed, such as an on-line encyclopedia like Wikipedia.

1.1 Pre-Processing Stage

Figure 2:
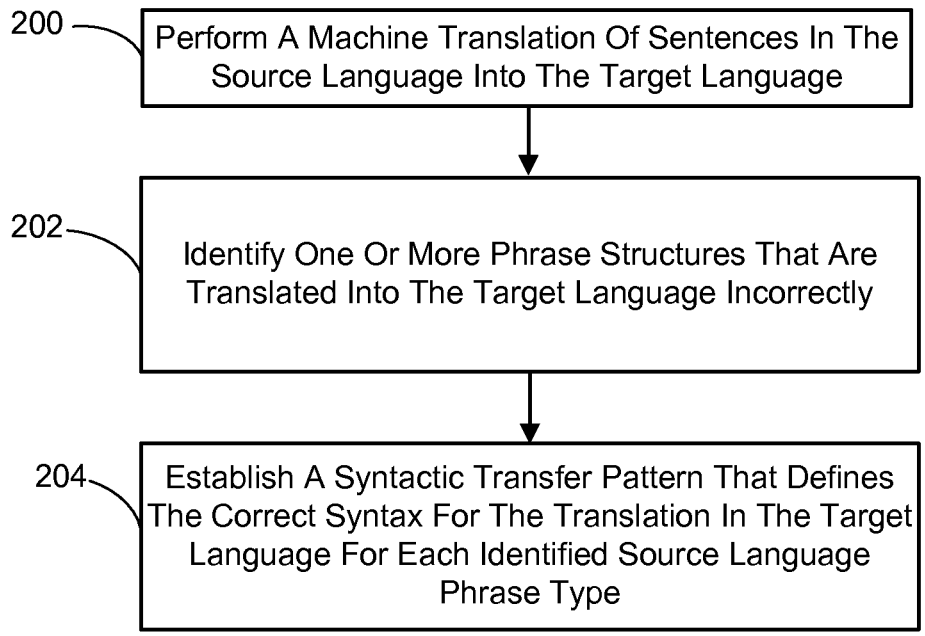
FIG. 2 is a flow diagram generally outlining an implementation of the part of the process of FIG. 1 involving generating syntactic transfer patterns in a pre-processing stage of the augmentation process, which in one variation involves identifying problematic syntactic patterns.

As indicated previously, the augmentation of a machine translation phrase table initially involves inputting one or more syntactic transfer patterns. Generally, these syntactic transfer patterns are generated in a pre-processing stage of the augmentation and can be associated with a phrase structure that is translated with an incorrect syntactic structure during machine translation. For example, in one implementation outlined in the process of FIG. 2, the syntactic transfer patterns are generated by first performing a machine translation of sentences in the source language into the target language (process action 200). These sentences can be taken from any source language corpus. In tested embodiments, approximately five thousand sentences were translated. The translated sentences are then analyzed to identify one or more phrase structures that are translated into the target language incorrectly (process action 202). For example, it has been found that existing machine translations of English language sentences into Arabic often translate possessive pronouns in noun phrases as standalone words instead of having them translated into target language suffixes. The foregoing analysis can be done manually as in tested embodiments, or using an appropriate computer-implemented method. For each identified source language phrase type, a syntactic transfer pattern is established that defines the correct syntax for the translation in the target language for the source language phrase type under consideration (process action 204). Once again, this can be accomplished manually as in tested embodiments, or using an appropriate computer-implemented method.

1.2 Source Language Phrase Synthesis

Figure 3:
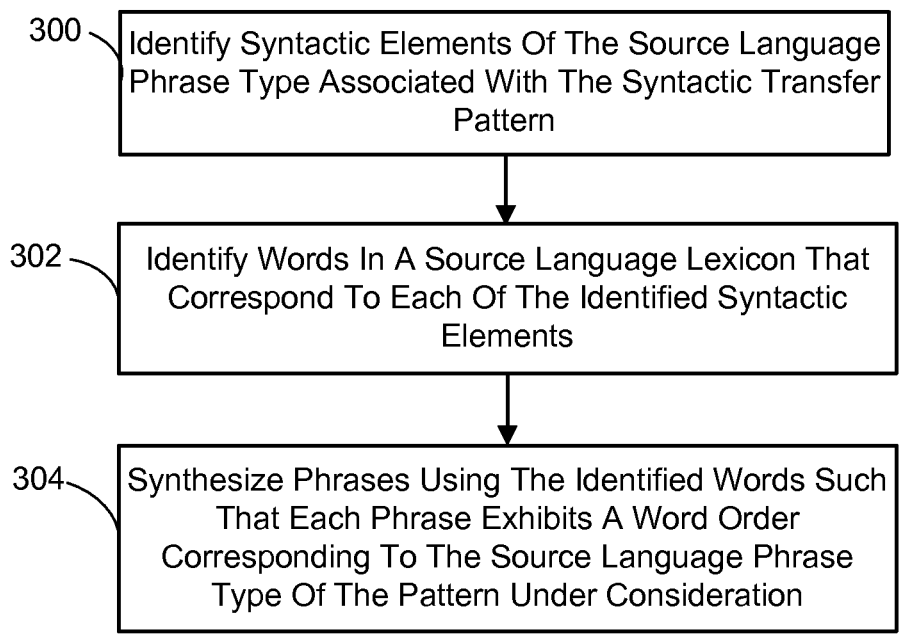
FIG. 3 is a flow diagram generally outlining an implementation of the part of the process of FIG. 1 involving synthesizing phrases in a source language of a type associated with a particular syntactic transfer pattern using a lexicon of the source language.

As indicated in the process of FIG. 1, the augmentation of a machine translation phrase table involves synthesizing phrases in a source language of a type associated with a particular syntactic transfer pattern under consideration using a lexicon of the source language. In one implementation outlined in the process of FIG. 3, this synthesis involves first identifying syntactic constituents of the source language phrase type associated with the syntactic transfer pattern (process action 300). For each of the identified syntactic constituents, words in the source language lexicon that correspond to the syntactic constituent are identified (process action 302). Then, phrases are synthesized using the identified words such that each phrase exhibits a word order corresponding to the source language phrase type of the pattern under consideration (process action 304). In one implementation, this last process action involves synthesizing a source language phrase for every possible combination of the identified words that conforms to the source language phrase structure.

1.3 Source Language Phrase Synthesis

Figure 4:
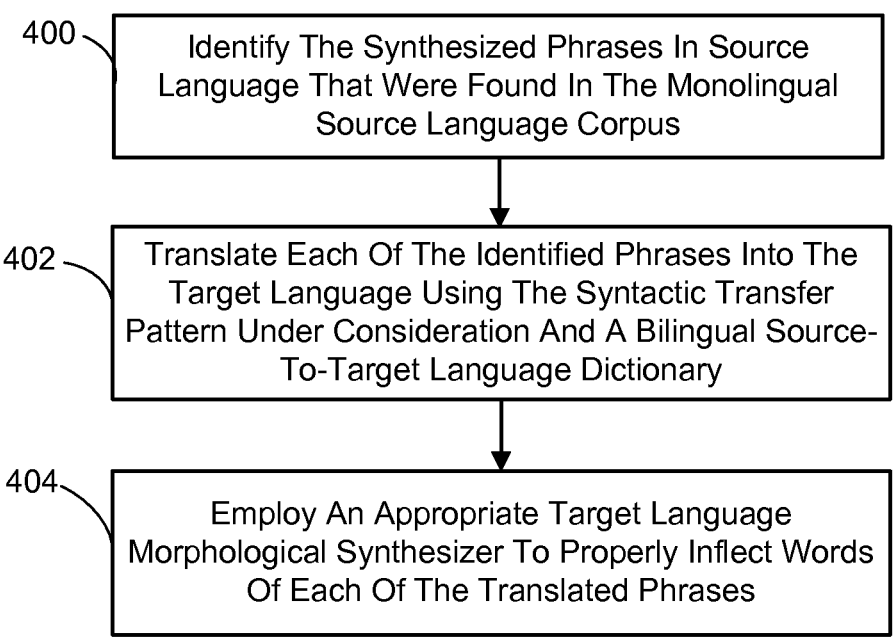
FIG. 4 is a flow diagram generally outlining an implementation of the part of the process of FIG. 1 involving synthesizing phrases in a target language of a type associated with a particular syntactic transfer pattern using a bilingual dictionary from the source language to the target language.

As indicated in the process of FIG. 1, the augmentation of a machine translation phrase table also involves translating each of the remaining synthesized phrases into the target language. In one implementation outlined in the process of FIG. 4, this involves first identifying the synthesized phrases in source language that were found in the monolingual source language corpus (process action 400). Each of these identified phrases is then translated into the aforementioned target language using the syntactic transfer pattern under consideration and a bilingual source-to-target language dictionary (process action 402). An appropriate target language morphological synthesizer is then employed to properly inflect words of each of the translated phrases (process action 404).

1.4 Phrase Table Augmentation Example

The following presents a simplified example of how machine translation phrase table augmentation embodiments described herein can be used to augment an English-to-Arabic language phrase table. While this example involves English as the source language and Arabic as the target language, it is not intended that the augmentation embodiments described herein be limited to these languages. Rather any source language and any target language are candidates for phrase table augmentation.

Figure 5:
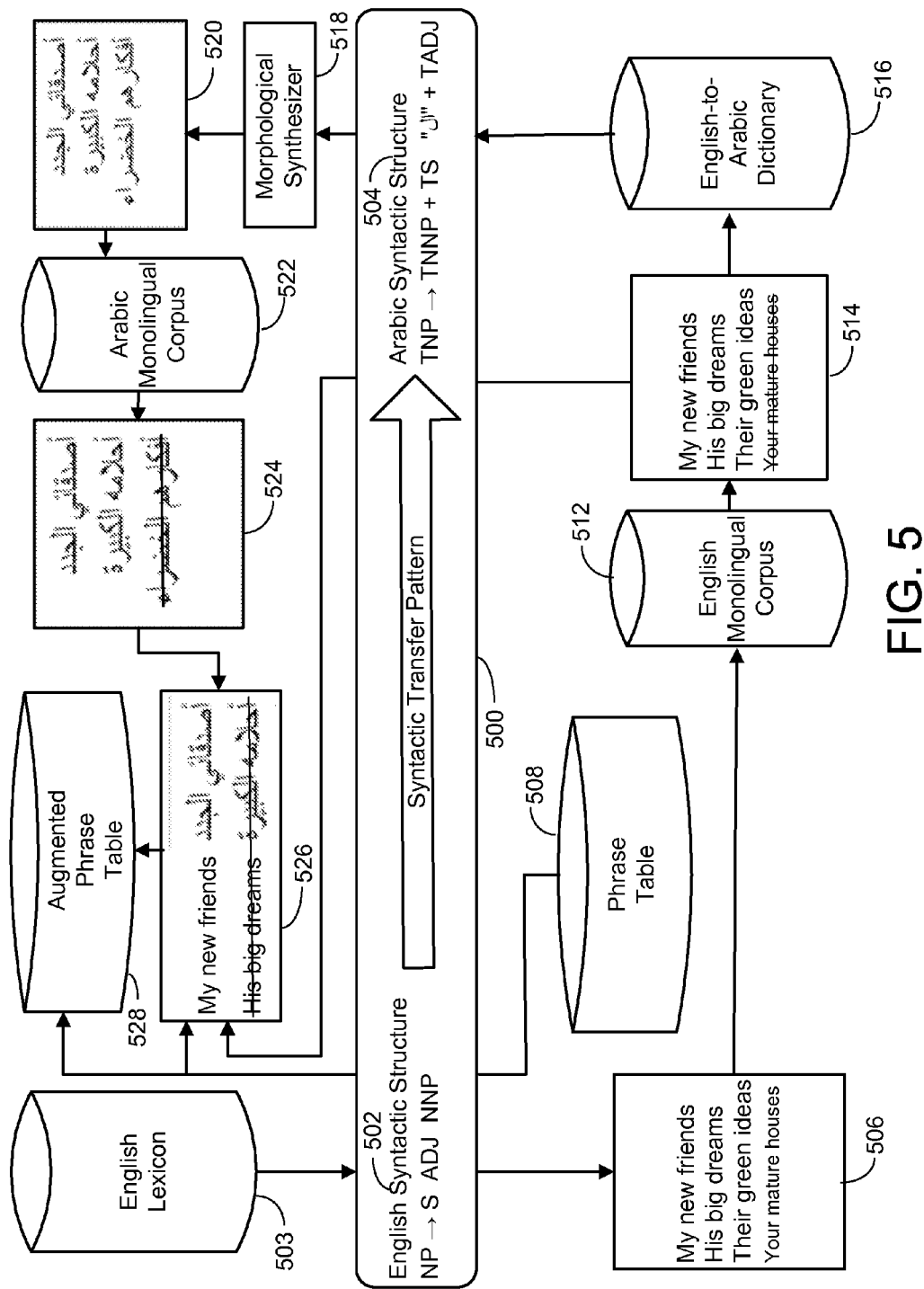
FIG. 5 is a simplified diagram exemplifying one way of augmenting an English-to-Arabic language phrase table.

Referring to FIG. 5, a syntactic transfer pattern 500 is shown which translates an English language noun phrase (NP) having an English syntactic structure 502 made up of a possessive pronoun (S) followed by an adjective (ADJ) and then a plural noun (NNP), to an Arabic language noun phrase having a correct Arabic syntactic structure 504. In this case, the correct Arabic syntactic structure 504 for the Arabic noun phrase is a combined "word" made up of the translation of the plural noun (TNNP) followed by the translation of the possessive pronoun (TS), and a second "word" having the translation of the adjective (TAD) prefixed by the definite article "ال".

Given the foregoing English syntactic structure 502, English language phrases 506 exhibiting this structure are synthesized using an English language lexicon database 503. More particularly, phrases 506 are synthesized using the words identified in the lexicon database 503 corresponding to possessive pronouns, adjectives and plural nouns, where each phrase exhibits a word order corresponding to the English syntactic structure 502. In the example shown in FIG. 5, just four English phrases 506 are synthesized for the sake of simplicity. However, in most implementation, many more phrases would be generated. For instance, millions or even tens of millions of phrases can be synthesized in the machine translation phrase table augmentation embodiments described herein.

The synthesized phrases 506 are compared to an English language monolingual corpus 512 using conventional methods to identify any of the phrases in the list that do not appear in the corpus. Those phrases that are not found in the English language monolingual corpus 512 are eliminated from the list 506 to produce a finalized English language phrase list 514. In the example shown in FIG. 5, the nonsensical phrase "Your mature houses" was identified as not being in the English language monolingual corpus 512 and eliminated to produce the finalized English language phrase list 514.

The remaining English language phrases from the finalized list 514 are translated into Arabic using an English to Arabic language dictionary 516 to translate each word in each phrase into Arabic. The translated words are then arranged and annotated as called for by the Arabic syntactic structure 504 and then processed by an appropriate morphological synthesizer 518 using conventional methods to properly inflect the words of the translated phrase. For example, the translation of the plural noun in an English language phrase may involve translating its singular stem into Arabic. The morphological synthesizer 518 would then put the Arabic translation of the stem word into its plural form in the translated phrase. The translated Arabic phrases are shown in the translation list 520 in FIG. 5.

The translated Arabic phrases in the translation list 520 are next compared to an Arabic language monolingual corpus 522 using conventional methods to identify any of the phrases on the translation list that do not appear in the corpus. Those phrases that are not found in the Arabic language monolingual corpus 522 are eliminated from the translation list 520 to produce a finalized Arabic language phrase list 524. In the example shown in FIG. 5, the Arabic phrase "أفكارهم الخضراء" was identified as not being in the Arabic language monolingual corpus 522 and eliminated to produce the finalized Arabic language phrase list 524.

A list of phrase pairs 526 is then generated using the finalized Arabic language phrase list 524 and the finalized English language phrase list 514. More particularly, each of the generated phrase pairs is made up of a translated phrase from the finalized Arabic language phrase list 524 and its corresponding English language phrase from the finalized English language phrase list 514. In the example in FIG. 5, two phrase pairs are generated—namely the phrase pairs "My new friends/أصدقائي الجدد" and "His big dreams/أحلامه الكبيرة". In the example of FIG. 5, the phrase pairs 526 are next compared to the current version of the machine translation phrase table 508 being augmented. Any of the phrase pairs that are found in the phrase table 508 are eliminated—as shown in the phrase pair list 526 where the phrase pair "His big dreams/أحلامه الكبيرة" was eliminated because it was found in the phrase table. The remaining phrase pairs (which in this case is just the phrase pair "My new friends/أصدقائي الجدد") are then added to the aforementioned current version of the phrase table 508 to produce an augmented version of the table 528. It is noted that while not shown in the example of FIG. 5, a probability can be computed for each of the generated phrase pairs, as described previously. The probability would then be associated with its phrase pair and added to the augmented phrase table as well.

2.0 Exemplary Operating Environments

Figure 6:
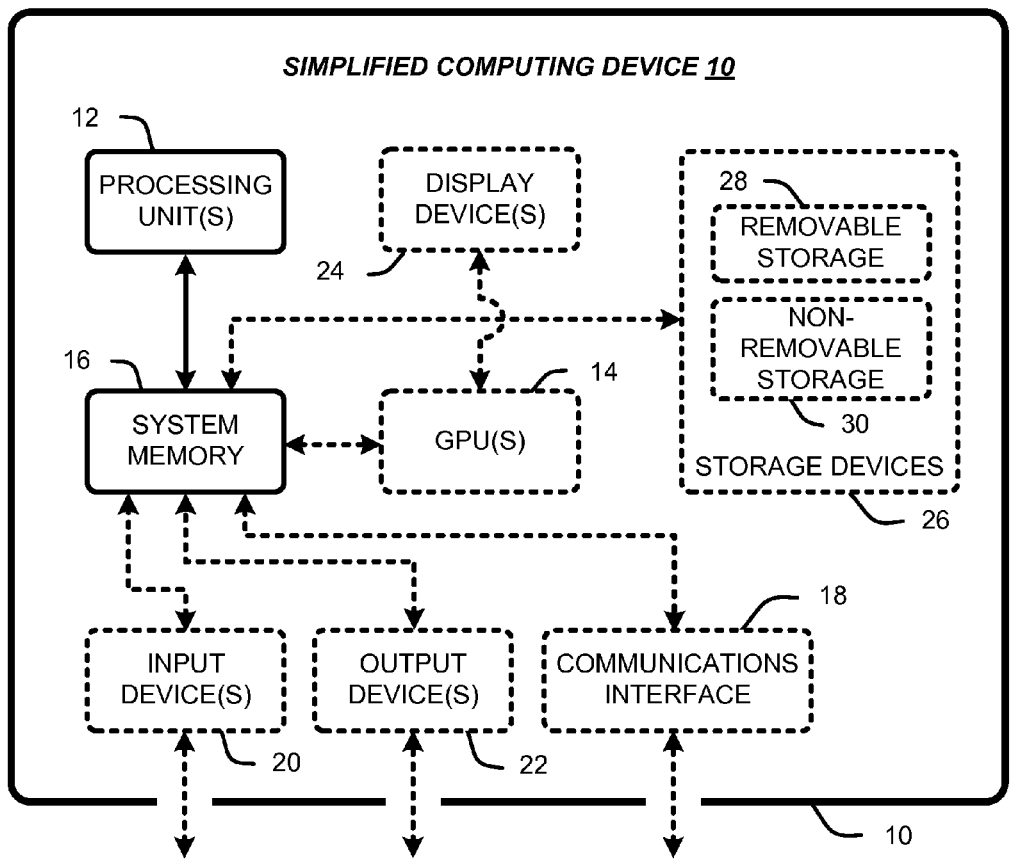
FIG. 6 is a diagram depicting a general purpose computing device constituting an exemplary system for implementing machine translation phrase table augmentation embodiments described herein.

The machine translation phrase table augmentation embodiments described herein are operational within numerous types of general purpose or special purpose computing system environments or configurations. FIG. 6 illustrates a simplified example of a general-purpose computer system on which various embodiments and constituents of the machine translation phrase table augmentation embodiments, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the machine translation phrase table augmentation embodiments described herein, the device should have a sufficient computational capability and system memory to enable basic computational operations. In particular, as illustrated by FIG. 6, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 6 may also include other components, such as, for example, a communications interface 18. The simplified computing device of FIG. 6 may also include one or more conventional computer input devices 20 (e.g., pointing devices, keyboards, audio input devices, video input devices, haptic input devices, devices for receiving wired or wireless data transmissions, etc.). The simplified computing device of FIG. 6 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 6 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the machine translation phrase table augmentation embodiments described herein, or portions thereof, may be stored, received, transmitted, or read from any desired combination of computer or machine readable media or storage devices and communication media in the form of computer executable instructions or other data structures.

Finally, the machine translation phrase table augmentation embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for augmenting a machine translation phrase table with additional phrase pairs each pair of which associates a phrase in a source language with a phrase in a target language, comprising:
   using a computer to perform the following process actions:
   inputting one or more syntactic transfer patterns, each of said patterns defining the syntax of a translation to the target language of a different phrase structure in the source language, wherein each source language phrase type represents a phase having a particular syntactic structure that is different from the other source language phrase types;
   for each inputted syntactic transfer pattern,
      synthesizing phrases in the source language of the type associated with the pattern under consideration using a lexicon of the source language,
      eliminating synthesized phrases not found in a monolingual corpus of the source language,
      for each remaining synthesized phrase, translating the synthesized phrase into the target language using the syntactic transfer pattern under consideration, a bilingual source-to-target language dictionary, and a morphological synthesizer to properly inflect the words of each translated phrase, and
      for each translated phrase, adding a phrase pair comprising the translated phrase and its corresponding source language phrase to the current version of the phrase table to produce an augmented version of the phrase table.

2. The process of claim 1, further comprising a process action of eliminating phrase pairs that are already found in a current version of the phrase table, prior to performing the action of adding phrase pairs to the phrase table.

3. The process of claim 1, further comprising a process action of eliminating translated phrases not found in a monolingual corpus of the target language, after performing the action of translating the synthesized phrase into the target language.

4. The process of claim 1, wherein the process action of synthesizing phrases in the source language of the type associated with the pattern under consideration using a lexicon of the source language, comprises synthesizing a phrase for every possible combination of words in the lexicon that correspond to syntactic constituents of the source language phrase type associated with the pattern under consideration.

5. The process of claim 1, wherein one or more of the inputted syntactic transfer patterns is associated with a phrase structure that is incorrectly translated during machine translation using the current version of the phrase table.

6. The process of claim 1, further comprising the process actions of:
computing a probability for each phrase pair added to the phrase table, said probability representing the likelihood that the source language phrase of the phrase pair translates to the target language phrase of the pair; and
for each probability computed, associating the probability with the phrase pair it was computed for and adding it to the augmented version of the phrase table.

7. The process of claim 6, wherein the process action of computing a probability for each phrase pair added to the phrase table, comprises of computing the probability for a phrase pair added to the phrase table using at least one factor, said factors comprising the frequency that the target language phrase of a phrase pair appears in a monolingual corpus of the target language, or the frequency that the source language phrase appears in the monolingual corpus of the source language, or the frequency of target phrases already in the phrase table which correspond to the same source phrase in the added phrase pair, or pre-established probabilities associated with phrase pairs already existing in the current version of the phrase table.

8. The process of claim 1, wherein said phrase types comprise noun phrases.

9. The process of claim 1, wherein the source language is English and the target language is Arabic.

10. A computer-implemented process for augmenting a machine translation phrase table with additional phrase pairs each pair of which associates a phrase in a source language with a phrase in a target language, comprising:
using a computer to perform the following process actions:
inputting one or more syntactic transfer patterns, each of said patterns defining the syntax of a translation to the target language of a different phrase structure in the source language, wherein each source language phrase type represents a phase having a particular syntactic structure that is different from the other source language phrase types;
for each inputted syntactic transfer pattern,
synthesizing phrases in the source language of the type associated with the pattern under consideration using a lexicon of the source language,
eliminating synthesized phrases not found in a monolingual corpus of the source language,
for each remaining synthesized phrase, translating the synthesized phrase into the target language using the syntactic transfer pattern under consideration, a bilingual source-to-target language dictionary, and a morphological synthesizer to properly inflect the words of each translated phrase,
eliminating translated phrases not found in a monolingual corpus of the target language,
for each remaining translated phrase, adding a phrase pair comprising the translated phrase and its corresponding source language phrase to the current version of the phrase table to produce an augmented version of the phrase table.

11. The process of claim 10, further comprising in a preprocessing stage performed prior to inputting the one or more syntactic transfer patterns, the process actions of:
performing a machine translation of sentences in the source language into the target language;
identifying one or more phrase structures from the source language sentences that are translated into the target language with an incorrect syntactic structure in the target language; and
for each identified source language phrase type, establishing a syntactic transfer pattern that defines a correct syntax of a translation to the target language from the source language for the phrase type under consideration.

12. The process of claim 10, wherein the process action of synthesizing phrases in the source language of the type associated with the pattern under consideration using a lexicon of the source language, comprises the actions of:
identifying syntactic constituents of the source language phrase type associated with the pattern under consideration;
for each identified syntactic constituent, identifying words in the lexicon that correspond to the identified syntactic constituent; and
synthesizing phrases using the identified words such that each phrase exhibits a word order corresponding the source language phrase type associated with the pattern under consideration.

13. The process of claim 10, wherein the process action of synthesizing phrases in the source language of the type associated with the pattern under consideration using a lexicon of the source language, comprises the actions of:
identifying syntactic constituents of the source language phrase type associated with the pattern under consideration;
for each identified syntactic constituent, identifying words in the lexicon that correspond to the identified syntactic constituent; and
synthesizing phrases using the identified words such that each phrase exhibits a word order corresponding the source language phrase type associated with the pattern under consideration and such that a phrase is synthesized for every possible combination of the identified words that conforms to the source language phrase type.

14. The process of claim 10, further comprising performing, prior to adding a phrase pair comprising a translated phrase and its corresponding source language phrase to the current version of the phrase table, the process actions of:
computing a probability for the phrase pair, said probability representing the likelihood that the source language phrase of the phrase pair translates to the target language phrase of the pair; and
associating the probability with the phrase pair.

15. The process of claim 14, wherein the process action of adding a phrase pair comprising a translated phrase and its corresponding source language phrase to the current version of the phrase table, comprises an action of adding the probability computed for the phrase pair along with the phrase pair to the current version of the phrase table.

16. A system for augmenting a machine translation phrase table with additional phrase pairs each pair of which associates a phrase in a source language with a phrase in a target language, comprising:

- one or more computing devices, wherein said computing devices are in communication with each other via a computer network whenever there are multiple computing devices; and
- a computer program having program modules executable by the one or more computing devices, the one or more computing devices being directed by the program modules of the computer program to,
  - input one or more syntactic transfer patterns, each of said patterns defining the syntax of a translation to the target language of a different phrase structure in the source language, wherein each source language phrase type represents a phase having a particular syntactic structure that is different from the other source language phrase types;
- for each inputted syntactic transfer pattern,
  - synthesize phrases in the source language of the type associated with the pattern under consideration using a lexicon of the source language,
  - eliminate synthesized phrases not found in a monolingual corpus of the source language,
  - for each remaining synthesized phrase, translate the synthesized phrase into the target language using the syntactic transfer pattern under consideration, a bilingual source-to-target language dictionary, and a morphological synthesizer to properly inflect the words of each translated phrase,
  - eliminate translated phrases not found in a monolingual corpus of the target language, and
  - for each remaining translated phrase,
    - generate a phrase pair comprising the translated phrase and its corresponding source language phrase,
    - eliminate phrase pairs that are already found in a current version of the phrase table, and
    - add the generated phrase pair to the current version of the phrase table.

17. The system of claim 16, further comprising program modules for:
- computing for each generated phrase pair, a probability representing the likelihood that the source language phrase of a phrase pair translates to the target language phrase of the pair;
- associating each probability with the phrase pair it was computed for; and
- adding each probability to the augmented version of the phrase table.

18. The system of claim 16, wherein the program module for synthesizing phrases in the source language of the type associated with the pattern under consideration using a lexicon of the source language, comprises a sub-module for synthesizing phrases representing combinations of words in the lexicon that correspond to syntactic constituents of the source language phrase type associated with the pattern under consideration.

19. The system of claim 16, wherein the program module for synthesizing phrases in the source language of the type associated with the pattern under consideration using a lexicon of the source language, comprises a sub-module for synthesizing a phrase for every possible combination of words in the lexicon that correspond to syntactic constituents of the source language phrase type associated with the pattern under consideration.

20. The system of claim 16, wherein the program module for inputting one or more syntactic transfer patterns, comprises a sub-module for inputting syntactic transfer patterns associated with a phrase structure that is incorrectly translated during machine translation.

\* \* \* \* \*